United States Patent [19]

Byrne

[11] 4,408,005

[45] Oct. 4, 1983

[54] FLAME RETARDANT POLYCARBONATES

[75] Inventor: Joseph B. Byrne, Antioch, Calif.

[73] Assignee: The Dow Chemical Company, Midland, Mich.

[21] Appl. No.: 360,712

[22] Filed: Mar. 22, 1982

[51] Int. Cl.$^3$ .............................................. C08K 3/30
[52] U.S. Cl. .................................. 524/421; 524/162; 524/418; 528/201
[58] Field of Search .......................... 524/421; 528/201

[56] References Cited

U.S. PATENT DOCUMENTS

| | | | |
|---|---|---|---|
| 3,036,036 | 5/1962 | Howe | 528/201 |
| 3,475,372 | 10/1969 | Gable | 524/83 |
| 4,028,297 | 6/1977 | Webb | 524/418 |
| 4,134,936 | 1/1979 | Byrne et al. | 528/201 |
| 4,327,015 | 4/1982 | Druschke et al. | 524/161 |

*Primary Examiner*—John Kight, III
*Assistant Examiner*—R. A. White
*Attorney, Agent, or Firm*—B. G. Colley

[57] ABSTRACT

Flame retardant polycarbonate compositions are prepared from dihydric aromatic compounds and alkali metal hydrogen sulfite. These compositions are more effective than similar compositions containing alkali metal sulfites.

6 Claims, No Drawings

FLAME RETARDANT POLYCARBONATES

BACKGROUND OF THE INVENTION

This invention relates to a flame retardant and moldable polycarbonates derived from dihydric aromatic compounds and alkali metal hydrogen sulfite.

It is known from U.S. Pat. No. 3,978,024 that homopolycarbonates can be rendered flame retardant by sulfonation of the polycarbonates followed by neutralization of the sulfonic acid groups with alkali metal hydroxides. However, these sulfonated polycarbonates are not convenient to make and use.

It is also known from U.S. Pat. No. 4,028,297 dated 6-7-77 that alkali metal salts of sulfite, thiosulfate, dithionite and pyrosulfite are useful fire retardant additives for polycarbonate resin. However, these compounds are not as efficient as the present alkali metal hydrogen sulfites.

SUMMARY OF THE INVENTION

It now has been discovered that flame retardant polycarbonate resin compositions can be prepared which are useful as moldable or thermoplastic polycarbonates. The compositions of this invention contain an amount of an alkali metal hydrogen sulfite effective to retard flaming of the polycarbonate resin.

The polycarbonates of this invention are flame resistant, and thermoplastic. The latter property implies they have a molecular weight range from about 25,000 to 60,000 as measured by gel permeation chromatography (G.P.C.).

DETAILED DESCRIPTION OF THE INVENTION

The polycarbonates of this invention are prepared by reacting and stirring a carbonyl halide with a dihydric aromatic compound such as bisphenol A or a mixture of dihydric aromatic compounds in a manner well known in the art.

The dihydric aromatic compound employed in the practice of this invention are known dihydric aromatic compounds in which the sole reactive groups are the two phenolic hydroxyl groups. Some of these are represented by the general formula

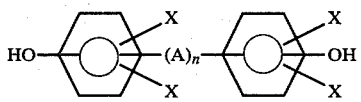

wherein

A is a divalent hydrocarbon radical containing 1-15 carbon atoms,

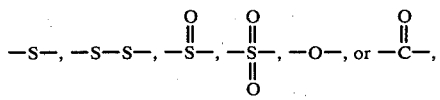

X is independently hydrogen, chlorine, bromine, fluorine, or a monovalent hydrocarbon radical such as an alkyl group of 1-4 carbons, an aryl group of 6-8 carbons such as phenyl, tolyl, xylyl, an oxyalkyl group of 1-4 carbons or an oxyaryl group of 6-8 carbons and n is 0 or 1.

One group of suitable dihydric aromatic compounds are those illustrated below:
1,1-bis(4-hydroxyphenyl)-1-phenyl ethane
1,1-bis(4-hydroxyphenyl)-1,1-diphenyl methane
1,1-bis(4-hydroxyphenyl)cyclooctane
1,1-bis(4-hydroxyphenyl)cycloheptane
1,1-bis(4-hydroxyphenyl)cyclohexane
1,1-bis(4-hydroxyphenyl)cyclopentane
2,2-bis(3-propyl-4-hydroxyphenyl)decane
2,2-bis(3,5-dibromo-4-hydroxyphenyl)nonane
2,2-bis(3,5-isopropyl-4-hydroxyphenyl)nonane
2,2-bis(3-ethyl-4-hydroxyphenyl)octane
4,4-bis(4-hydroxyphenyl)heptane
3,3-bis(3-methyl-4-hydroxyphenyl)hexane
3,3-bis(3,5-dibromo-4-hydroxyphenyl)hexane
2,2-bis(3,5-difluoro-4-hydroxyphenyl)butane
2,2-bis(4-hydroxyphenyl)propane(Bis A)
1,1-bis(3-methyl-4-hydroxyphenyl)ethane
1,1-bis(4-hydroxyphenyl)methane.

Another group of dihydric aromatic compounds useful in the practice of the present invention include the dihydroxyl diphenyl sulfoxides such as for example:
bis(3,5-diisopropyl-4-hydroxyphenyl)sulfoxide
bis(3-methyl-5-ethyl-4-hydroxyphenyl)sulfoxide
bis(3,5-dibromo-4-hydroxyphenyl)sulfoxide
bis(3,5-dimethyl-4-hydroxyphenyl)sulfoxide
bis(3-methyl-4-hydroxyphenyl)sulfoxide
bis(4-hydroxyphenyl)sulfoxide.

Another group of dihydric aromatic compounds which may be used in the practice of the invention includes the dihydroxyaryl sulfones such as, for example:
bis(3,5-diisopropyl-4-hydroxyphenyl)sulfone
bis(3,5-methyl-5-ethyl-4-hydroxyphenyl)sulfone
bis(3-chloro-4-hydroxyphenyl)sulfone
bis(3,5-dibromo-4-hydroxyphenyl)sulfone
bis(3,5-dimethyl-4-hydroxyphenyl)sulfone
bis(3-methyl-4-hydroxyphenyl)sulfone
bis(4-hydroxyphenyl)sulfone.

Another group of dihydric aromatic compounds useful in the practice of the invention includes the dihydroxydiphenyls:
3,3',5,5'-tetrabromo-4-4'-dihydroxydiphenyl
3,3'-dichloro-4,4'-dihydroxydiphenyl
3,3'-diethyl-4,4'-dihydroxydiphenyl
3,3'-dimethyl-4,4'-dihydroxydiphenyl
p,p'-dihydroxydiphenyl.

Another group of dihydric aromatic compounds which may be used in the practice of the invention includes the dihydric phenol ethers:
bis(3-chloro-5-methyl-4-hydroxyphenyl)ether
bis(3,5-dibromo-4-hydroxyphenyl)ether
bis(3,5-dichloro-4-hydroxyphenyl)ether
bis(3-ethyl-4-hydroxyphenyl)ether
bis(3-methyl-4-hydroxyphenyl)ether Other dihydric aromatic compounds of interest include the phthalein type bisphenols which are disclosed in U.S. Pat. Nos. 3,035,021; 3,036,036; 3,036,037; 3,036,038; and 3,036,039.

It is, of course, possible to employ a mixture of two or more different dihydric aromatic compounds in preparing the thermoplastic carbonate polymers of the invention.

The carbonate precursor employed in the process of this invention to prepare the linear thermoplastic polycarbonates is one of the carbonyl halides. Examples of the carbonyl halides are carbonyl bromide, carbonyl chloride and carbonyl fluoride.

The following examples and controls are presented to illustrate but not limit the present invention:

EXAMPLE 1

Weighed amounts of a pre-dried commercial bisphenol A polycarbonate (Merlon M50F from Mobay Chemical Corporation) and sodium bisulfite (reagent grade) were dry mixed, processed through a laboratory extruder at 500° F. and pelletized.

The pelletized mixture was dried and compression molded at 450° F. to form 6"×3"×1/8" plaques. Test pieces were fabricated from the plaque for determination of flammability ratings and notched Izod impact strength (ASTM D256-72a). Flammability ratings determined were limiting oxygen index and Underwriters Laboratories Standard, UL94.

Limiting oxygen index is defined as the minimum concentration of oxygen expressed as volume percent, in a mixture of oxygen and nitrogen that will just support flaming combustion of a material initially at room temperature under conditions described in the method ASTM D2863-74.

Requirements to be met in order that a material conform to the Underwriters Laboratories UL94 ratings are shown in Table I.

TABLE I

| Rating | V-0 | V-1 | V-2 |
| --- | --- | --- | --- |
| No. of specimens | 5 | 5 | 5 |
| No. of flame applications | 10 | 10 | 10 |
| Total flaming combustion time, seconds | 50 | 250 | 250 |
| Single maximum flaming combustion time, seconds | 10 | 30 | 30 |
| Maximum glowing combustion time after second ignition, seconds | 30 | 60 | 60 |
| Specimens with flaming drips that ignite cotton | None | None | Allowed |

Bisphenol A polycarbonate samples were prepared containing from zero to 1.5% sodium bisulfite.

Limiting oxygen index values, UL-94 ratings and notched Izod impact strengths of these samples are listed in Table II.

The data of Table II show that sodium bisulfite in sodium bisulfite-bisphenol A polycarbonate compositions does not significantly affect notched Izod impact strength at concentrations up to about 0.5%.

TABLE II

| $NaHSO_3$ % | L.O.I.* % $O_2$ | UL-94 Rating | Izod Impact Strength, ft.lb./in. |
| --- | --- | --- | --- |
| 0 | 27 | Burning | 18.8 |
| 0.01 | 27 | V-2 | 19.2 |
| 0.03 | 31 | V-0 | 19.7 |
| 0.05 | 33 | V-0 | 18.3 |
| 0.075 | 32 | V-0 | 17.7 |
| 0.09 | 32 | V-0 | 18.7 |
| 0.10 | 33 | V-0 | 17.6 |
| 0.25 | 28 | V-2 | 19.2 |
| 0.5 | 26 | V-2 | 17.5 |
| 1.0 | 28 | V-2 | 2.1 |
| 1.5 | 24 | V-2 | 7.0 |

*Limiting Oxygen Index

Data in Table II show that sodium bisulfite-bisphenol A polycarbonate compositions have improved fire retardancy compared to bisphenol A polycarbonate without sodium bisulfite. UL94 data show fire retardancy improvement up to about 1.5% sodium bisulfite. Limiting oxygen index data show improvement up to about 0.25% sodium bisulfite. Both UL94 and limiting oxygen index data show maximum fire retardancy improvement in the sodium bisulfite concentration range of about 0.03% to about 0.10%. Only compositions with sodium bisulfite concentrations in this range meet the most stringent requirements of the Underwriters Laboratories Standard 94. Compositions outside of this sodium bisulfite concentration range do not meet the non-dripping requirement of UL94.

EXAMPLE 2

An aromatic polycarbonate was prepared by reacting 2,2-bis(4-hydroxyphenyl) propane, dissolved in methylene chloride-pyridine solution, with phosgene using 4-tertiarybutylphenol as molecular weight regulator. Inherent viscosity of the bisphenol A polycarbonate obtained was 0.521. Mixtures of this bisphenol A polycarbonate were prepared containing from 0.03% to 0.5% sodium bisulfite. These mixtures were dried at 120° C., processed through an extruder operated at 500° F. and pelletized. Extruded pellets were dried at 120° C. and injection molded to form bars 1/8 in.×1/2 in.×5 in. Bars obtained were transparent and of good appearance. Standard specimens were prepared from these bars for measurement of limiting oxygen index and Izod impact strength. Underwriters Laboratories Standard UL94 ratings were determined with the bars as molded. Results from these tests are presented in Table III.

TABLE III

Bisphenol A Polycarbonate-Sodium Bisulfite Mixtures

| $NaHSO_3$ % | L.O.I.* % $O_2$ | UL-94 Rating | Izod Impact Strength, ft.lb./in. |
| --- | --- | --- | --- |
| 0 | 32 | V-2 | 19.2 |
| 0.03 | 35 | V-0 | 18.6 |
| 0.5 | 34 | V-0 | 18.6 |
| 0.10 | 31 | V-0 | 18.1 |
| 0.15 | 30 | V-0 | 18.0 |
| 0.50 | 29 | V-2 | 14.4 |

Bisphenol A polycarbonate used in this example contains no additives other than sodium bisulfite. Results are comparable with results presented in Example 1 wherein a commercial bisphenol A polycarbonate was used.

EXAMPLE 3

An aromatic co-polycarbonate was prepared from a mixture containing 25% by weight phenolphthalein and 75% by weight 2,2-bis(4-hydroxyphenyl)propane. This mixture was dissolved in a methylene chloride-pyridine solution and reacted with phosgene using 4-tertiarybutylphenol as molecular weight regulator. Inherent viscosity of the product obtained was 0.491. Mixtures of this bisphenol A-phenolphthalein co-polycarbonate were prepared containing from 0.01 to 0.50% sodium bisulfite. Mixtures were also prepared containing from 0.01 to 0.50% sodium sulfite. These mixtures were dried at 120° C., processed through an extruder operated at 525° F. and pelletized. Extruded pellets were dried at 120° C. and injection molded to form bars 1/8 in.×1/2 in.×5 in. Bars containing either sodium bisulfite or sodium sulfite were colored brown, amount of coloration ranging from small at 0.01% additive to very dark brown at 0.5% additive.

Injection molded bars were utilized for measurement of limiting oxygen index rating, Izod impact strength, and Underwriters Laboratories Standard UL94 ratings. Results from these tests are presented in Table IV.

Both sodium bisulfite and sodium sulfite cause color formation in bisphenol A-phenolphthalein co-polycarbonate. Amount of color formation is significant at 0.03% of either additive and excessive at 0.075%. Because of color formation, preferred maximum concentration of either sodium bisulfite or sodium sulfite is 0.03%. Within this concentration range, superior Izod impact strength and superior limiting oxygen index is obtained with polymer containing sodium bisulfite compared with polymer containing sodium sulfite. UL94 rating of V-O is obtained with untreated polymer and also with polymer containing either sodium bisulfite or sodium sulfite up to a concentration of 0.10%. A stronger V-O rating with either additive is obtained at 0.01% and 0.03% additive as indicated by the lowering of average flaming combustion time from that of polymer containing no additive.

Some haze was visible in each set of bars at about 0.2% sodium bisulfite or sodium sulfite.

Injection molded bars were utilized for measurement of Izod impact strength, limiting oxygen index, and Underwriters Laboratories Standard UL94 ratings. Results from these tests are presented in the accompanying Table V. Data presented in this table show that bisphenol A polycarbonate containing sodium bisulfite has good retention of impact strength and fire retardant properties generally superior to that of bisphenol A polycarbonate containing sodium sulfite.

TABLE V

| Example | NaHSO₃ (Na₂SO₃) | LOI* | Av. F.C. Time** (sec.) | Max. F.C. Time (sec.) | UL-94 Rating | Izod Impact Ft.lbs./In. |
|---|---|---|---|---|---|---|
| Control | 0 | 26 | 14.1 | 22.2 | >V-2 | 18.9 |
| 1 | 0.01 | 28(25) | 10.3 (23.8) | 16.0 (71.0) | V-2(>V-2) | 17.8(19.9) |
| 2 | 0.03 | 30(27) | 5.6 (10.9) | 14.8 (28.0) | V-2(V-2) | 18.3(18.5) |
| 3 | 0.05 | 31(31) | 3.8 (6.4) | 9.6 (17.0) | V-2(V-2) | 17.6(17.4) |
| 4 | 0.075 | 35(32) | 2.2 (5.8) | 5.0 (22.0) | V-0(V-2) | 17.4(17.9) |
| 5 | 0.10 | 32(32) | 2.1 (3.7) | 6.4 (9.8) | V-0(V-0) | 16.9(17.9) |
| 6 | 0.125 | 35(32) | 1.4 (6.6) | 3.0 (22.0) | V-0(V-1) | 15.5(17.9) |
| 7 | 0.15 | 35(32) | 3.2 (3.6) | 7.0 (9.0) | V-0(V-0) | 15.7(17.7) |
| 8 | 0.20 | 32(32) | 4.3 (4.4) | 9.4 (13.4) | V-2(V-2) | 8.0(8.4) |
| 9 | 0.50 | 27(28) | 7.4 (7.1) | 18.0 (23.0) | V-2(V-2) | 3.0(9.6) |
| 10 | 1.0 | 25(26) | 15.3 (6.1) | 40.6 (18.2) | >V-2(V-2) | 3.0(2.6) |

*Limiting Oxygen index.
**Average flaming combustion time.

TABLE IV

| Run | Percent NaHSO₃ (Na₂SO₃) | Izod Impact ft.lbs./in. | LOI* % O₂ | Av. F.C. Time** Time, (sec.) | UL-94 Rating |
|---|---|---|---|---|---|
| Control | 0 | 9.9 | 29 | 2.3 | V-0 |
| 1 | 0.01 | 7.3 (2.8) | 32 (31) | 1.4 (1.3) | V-0 (V-0) |
| 2 | 0.03 | 4.4 (3.8) | 36 (33) | 2.0 (1.3) | V-0 (V-0) |
| 3 | 0.075 | 2.6 (3.4) | 32 (32) | 2.8 (2.9) | V-0 (V-0) |
| 4 | 0.10 | 2.2 (2.8) | 31 (29) | 4.4 (4.3) | V-0 (V-0) |
| 5 | 0.50 | 0.9 (1.6) | 28 (27) | 6.1 (6.7) | V-1 (V-1) |

*Limiting Oxygen Index
**Average Flaming Combustion

EXAMPLE 4

Mixtures of bisphenol A polycarbonate and sodium bisulfite were prepared containing from 0.01% to 1.0% sodium bisulfite. Mixtures of bisphenol A polycarbonate and sodium sulfite were also prepared containing 0.01% to 1.0% sodium sulfite. A commercial bisphenol A polycarbonate, Merlon ® M40-1000, manufactured by Mobay Chemical Corporation, was used in these mixtures. Inherent viscosity of the polycarbonate at 0.5 g/dl in methylene chloride was 0.474 dl/g. Mixtures were dried at 120° C., processed through an extruder operated at 500° F. and pelletized. Extruded pellets were dried at 120° C. and injection molded to form bars ⅛"×½"×5". Bars containing either sodium bisulfite or sodium sulfite compared visually had essentially the same color at equal additive concentration and showed only small increase in color throughout the concentration range studied compared to unmodified polymer.

I claim:

1. A flame retardant thermoplastic composition comprising an aromatic polycarbonate and an amount of an alkali metal hydrogen sulfite effective to retard flaming.

2. The composition of claim 1 wherein the amount of said sulfite used is 0.03 to 0.10 percent by weight based on the weight of said polycarbonate.

3. The composition of claim 1 wherein the aromatic polycarbonate is prepared from a dihydric aromatic compound having the formula

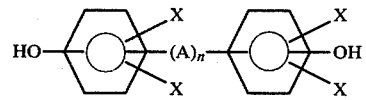

wherein
A is a divalent hydrocarbon radical containing 1-15 carbon atoms,

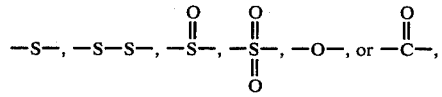

X is independently hydrogen, chlorine, bromine, fluorine, or a monovalent hydrocarbon radical such as an alkyl group of 1-4 carbons, an aryl group of 6-8 carbons such as phenyl, tolyl, xylyl, an oxyalkyl group of 1-4 carbons or an oxyaryl group of 6-8 carbons and n is 0 or 1.

4. The composition of claim 1 wherein the aromatic polycarbonate is prepared from a mixture of 2,2-bis(4-hydroxyphenyl) propane and phenolphthalein.

5. The composition of claim 3 wherein the amount of said sulfite used is 0.03 to 0.10 percent by weight based on the weight of said polycarbonate.

6. The composition of claim 4 wherein the amount of said sulfite used is 0.03 to 0.10 percent by weight based on the weight of said polycarbonate.

* * * * *